United States Patent [19]

Brinkmann et al.

[11] 4,271,395
[45] Jun. 2, 1981

[54] DYESTUFF LASER

[75] Inventors: Uwe Brinkmann; Helmut Telle, both of Cologne; Roderich Raue, Leverkusen, all of Fed. Rep. of Germany

[73] Assignee: Bayer Aktiengesellschaft, Leverkusen, Fed. Rep. of Germany

[21] Appl. No.: 866,521

[22] Filed: Jan. 3, 1978

[30] Foreign Application Priority Data

Jan. 5, 1977 [DE] Fed. Rep. of Germany ....... 2700293

[51] Int. Cl.² ............................................. H01S 3/20
[52] U.S. Cl. ........................... 331/94.5 L; 252/301.17
[58] Field of Search ............. 331/94.5 L; 252/301.17; 542/461

[56] References Cited

U.S. PATENT DOCUMENTS

| | | | |
|---|---|---|---|
| 3,766,083 | 10/1973 | Langstroth et al. | 541/461 |
| 3,954,740 | 5/1976 | Fringeli | 542/461 |
| 4,025,507 | 5/1977 | Fleck et al. | 542/461 |
| 4,072,911 | 2/1978 | Hartig et al. | 331/94.5 L |

FOREIGN PATENT DOCUMENTS 7607198  1/1977  Netherlands ....................... 331/94.5 L

OTHER PUBLICATIONS

Majewski et al., Optics Communications, Aug. 1976, vol. 18, No. 3, pp. 255–259.

Primary Examiner—William D. Larkins
Attorney, Agent, or Firm—Sprung, Felfe, Horn, Lynch & Kramer

[57] ABSTRACT

Laser light in the wavelength range of 420–480 nm is obtained with a dyestuff laser containing a dyestuff of the general formula

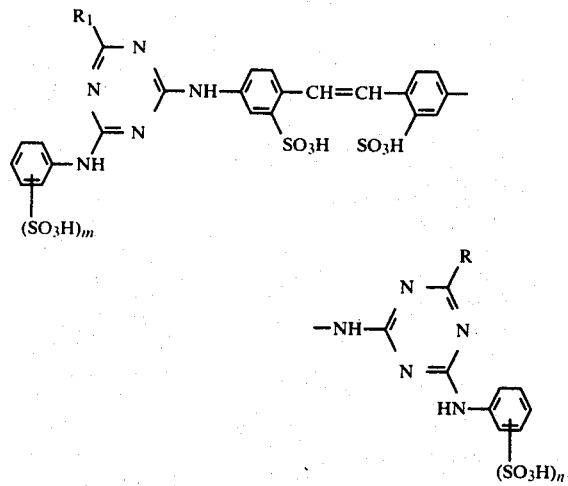

wherein
R and $R_1$ independently of one another represent

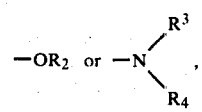

$R_2$ denotes an optionally substituted alkyl radical with 1–4 C atoms,
$R_3$ and $R_4$ independently of one another represent hydrogen or optionally substituted $C_1$–$C_4$-alkyl or conjointly with the nitrogen can form a 5-membered or 6-membered heterocyclic ring and m and n denote 1 or 2, and wherein
the aromatic radicals contained in the formula can be further substituted, in a solvent which does not interfere with the emission, at a concentration, which emits laser beams, of, preferably, $10^{-2}$ to $10^{-5}$ mols/liter.

4 Claims, 2 Drawing Figures

DYESTUFF LASER

BACKGROUND OF THE INVENTION

1. Field of the Invention

The subject of the invention is a process for the production of coherent monochromatic radiation (laser light), the frequency of which can be changed, by means of a dyestuff laser which consists of a reservoir for the dyestuff solution and an energy source, associated therewith, which is capable of exciting the dyestuff solution to produce an emission, the radiation produced being in the wavelength range of 420–480 nm.

2. Discussion of the Prior Art

A laser is a light intensification device by means of which it is possible to produce coherent monochromatic light of a high spectral and geometric intensity density. The laser consists of an optical resonator which contains the liquid laser-active material in a thin-walled quartz cylinder. The cylinder is usually part of a closed system through which the dyestuff solution is circulated by pumping whilst the laser is in operation. This avoids localised overheating, which leads to optical inhomogeneities.

The excitation of the dyestuffs is effected with the aid of energy sources, by means of electrons or light, and the dyestuff laser can also be excited by a gas laser, for example a nitrogen laser or argon laser.

The excitation, which is also termed optical pumping, has the effect of raising the electrons of the molecule of the laser dyestuff from their normal state to a high energy state, from which a radiation transition takes place. If the number of molecules present in the excited state exceeds that of the molecules in lower states, this gives rise to stimulated transitions, by means of which the light is intensified in the optical resonator.

If one of the laser mirrors is partially transparent to light, a part of the radiation leaves the apparatus in the form of a laser beam. Dyestuffs which can be excited particularly easily exhibit the phenomenon of "super radiance" with highly effective excitation. This can be observed, for example, if a quartz cell containing the solution of such a dyestuff is placed in the beam of a nitrogen laser. The solution then emits laser light without being located between resonator mirrors.

A considerable advantage of the dyestuff laser compared with solid or gas lasers is its ability to supply laser radiation of a frequency which can be changed. Because of the width of the fluorescence band of the dyestuffs employed, dyestuff lasers can be so tuned, by inserting a frequency-selective element, for example a reflection grating or a prism, that laser light is emitted at any desired wavelength within the entire fluorescence band of the dyestuff.

Although a large number of suitable dyestuffs has already been proposed, there is, nevertheless, still a considerable lack in many regions of the visible wavelength range of compounds which give a very high degree of effectiveness of the laser.

SUMMARY OF THE INVENTION

Accordingly, the subject of the invention is a dyestuff laser consisting of a reservoir, with a laser dyestuff solution contained therein, and a pump light source connected thereto, which is capable of exciting the dyestuff solution to produce an emission, characterised in that the dyestuff solution contains a dyestuff which, in the form of the free acid, corresponds to the general formula

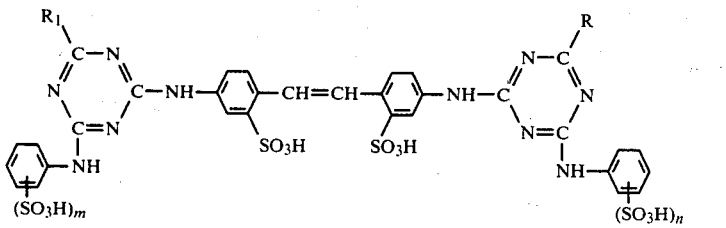

wherein
R and $R_1$ independently of one another represent

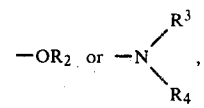

$R_2$ denotes an optionally substituted alkyl radical with 1–4 C atoms,
$R_3$ and $R_4$ independently of one another represent hydrogen or optionally substituted $C_1$–$C_4$-alkyl or conjointly with the nitrogen form a 5-membered or 6-membered heterocyclic ring and
m and n denote 1 or 2, and wherein
the aromatic radicals contained in the formula can be further substituted, in a solvent which does not interfere with the emission, at a concentration, which emits laser beams, of, preferably, $10^{-2}$ to $10^{-5}$ mols/liter.

Examples which may be mentioned of substituents for the aromatic radicals are: $C_1$–$C_5$-alkyl radicals which can also be further substituted, such as methyl, trifluoromethyl, ethyl, cyanoethyl or tert.-butyl, 5-membered or 6-membered cycloalkyl radicals, such as cyclohexyl, phenylalkyl radicals, such as benzyl, halogen atoms, such as chlorine, bromine or fluorine and preferably chlorine, $C_1$–$C_5$-alkoxy radicals, such as methoxy, ethoxy, n-butoxy and iso-propoxy, the phenoxy radical, $C_1$–$C_5$-alkylsulphonyl radicals, such as methylsulphonyl, ethylsulphonyl, n-butylsulphonyl and β-hydroxyethylsulphonyl, the benzylsulphonyl radical, the phenylsulphonyl radical, carbamoyl or sulphamoyl radicals, which are also optionally substituted by 1 or 2 $C_1$–$C_4$-alkyl radicals, or the cyano radical.

Possible substituents for the alkyl radicals $R_2$, $R_3$ and $R_4$ are, in particular, halogen atoms such as fluorine, chlorine and bromine, cyano groups and hydroxyl, sulpho, carboxyl and phenyl or $C_1$–$C_4$-alkoxy radicals.

Suitable heterocyclic rings, which can be formed by $R_3$ and $R_4$ with the inclusion of the nitrogen atom, are, for example, morpholine, piperidine, pyrrolidine and N-methylpiperazine.

The laser dyestuffs can be employed as the free acids or in the form of their acid or neutral salts, possible cations being monovalent or divalent metals, such as sodium, potassium, lithium, magnesium, calcium, barium, manganese and zinc, as well as mono-, di- and tri-alkylammonium groups starting from mono-, di- and tri-methylamine, mono-, di- and tri-ethylamine, mono-, di- and tri-ethanolamine, methyldiethanolamine, ethyldiethanolamine, dimethylethanolamine, diethylethanolamine, mono-, di- and tri-isopropanolamine, methyl-di-isopropanolamine, ethyl-di-isopropanolamine, dimethylisopropanolamine, diethylisopropanolamine, n-butylamine, sec.-butylamine, dibutylamine and diisobutylamine.

Preferred laser dyestuffs of the formula I correspond to the formula

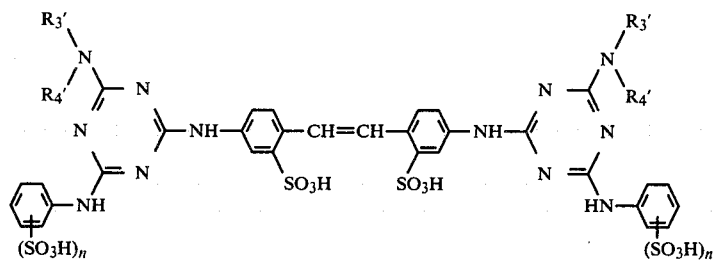

wherein
$R_3'$ and $R_4'$ represent hydrogen, methyl, ethyl, hydroxyethyl or hydroxypropyl, or conjointly with the nitrogen represent the morpholine ring and n denotes 1 or 2.

Examples of solvents which do not hinder the stimulated emission and can be used according to the invention are water, monohydric and polyhydric alcohols, for example ethanol, methanol, isopropanol, butanol and ethylene glycol, glycol monoethyl ether, cyclic ethers, such as tetrahydrofurane and dioxane, esters, such as glycol diacetate, diethyl carbonate and fluorinated alcohols, for example hexafluoroisopropanol.

The use of solvent mixtures, especially mixtures of alcohols with water, is likewise possible.

In water, a number of the compounds according to the invention display a reduction in the laser activity as a result of the formation of associates. In this case, the laser activity can be increased by the addition of surface-active compounds, especially non-ionic emulsifiers, for example the reaction products of $C_9$-$C_{12}$-alkylphenols, phenylalkylphenols, oxydiphenyl, oleyl alcohol or longer-chain aliphatic alcohols with 6–50 mols of ethylene oxide.

In recent years laser light from lasers which have a frequency which can be changed has attained considerable importance in spectroscopy. The lasers can be employed for analytical purposes, high resolution spectroscopy, fluorescence spectroscopy, absorption spectroscopy, life measurements and photoionisation and in the spectroscopy of negative ions. They are also of great technical importance in information techniques, in environmental protection and for the separation of isotopes.

A number of the compounds according to the invention show, as a particular advantage, the effect of "super radiance".

The preparation of the compounds according to the invention is effected by reacting 4,4'-diamino-stilbene-2,2'-disulphonic acid with cyanuric chloride, aminobenzenesulphonic acids and ammonia, optionally substituted alkylamines or 5-membered or 6-membered nitrogen heterocyclic compounds in a manner which is in itself known.

BRIEF DESCRIPTION OF DRAWINGS

Referring to the annexed drawings.

EXAMPLE

The laser activity of the compound of the formula

Figure 1:
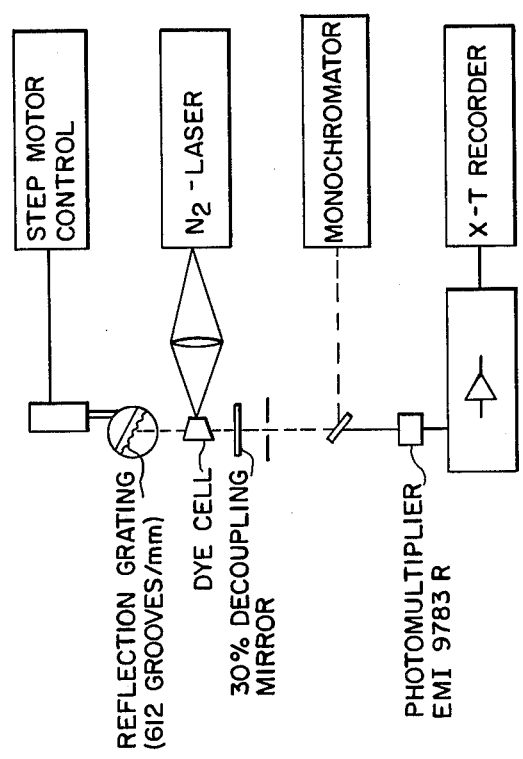
FIG. 1 shows a typical arrangement of components used to measure laser activity of a laser dyestuff according to the invention.

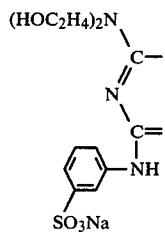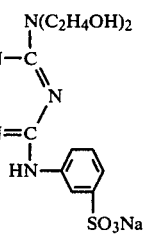

was examined in a measuring apparatus according to FIG. 1. The nitrogen laser used had a wavelength of 337 nm, a pulse frequency of B 60 Hz, a pulse width Δ t of 7 nsec and a pulse power of 100 kW.

The compound of the above formula was pumped, in a concentration of $2 \times 10^{-3}$ mol/liter, from a reservoir through the dyestuff cell. The frequency of the wavelength was varied by a reflection grating with a step motor drive. The laser spectrum was recorded via a photomultiplier and a recorder and the wavelength was calibrated via the monochromator. In order to measure the power, the photomultiplier was replaced by a thermopile measuring head with an ancillary measuring amplifier. The intensity in percent of the pump power is also given in kW since the initial pulse power was 100 kW.

Figure 2:
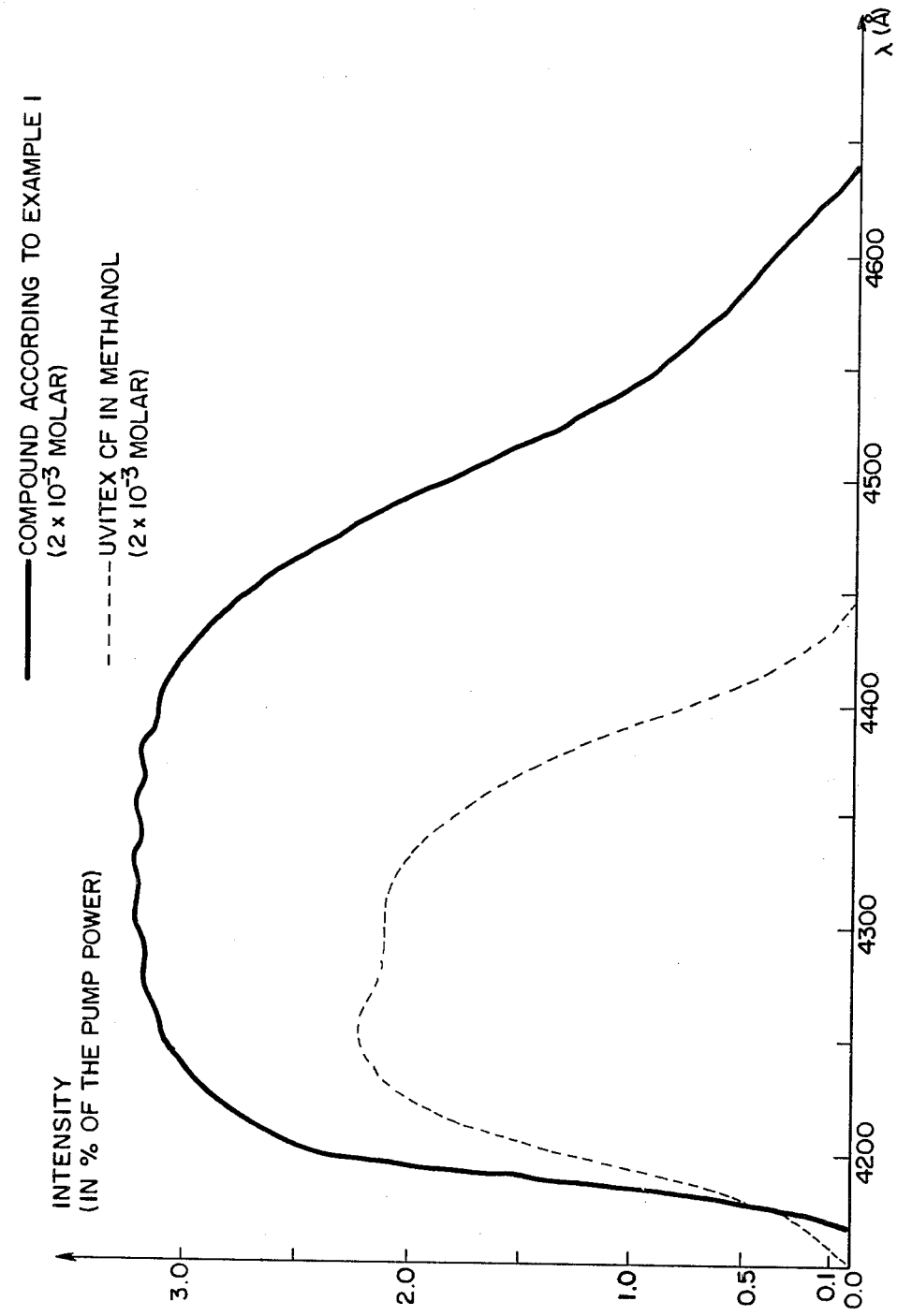
FIG. 2 is a graph showing the relationship of laser power to wave length for a laser dyestuff according to the invention. The graph also shows the relationship of the claimed dyestuff to a known dyestuff.

The dependence of the laser power on the wavelength is given in FIG. 2. The laser power curve of Uvitex CF, the laser activity of which is described in Optics Communications 18, 3 page 256 (August 1976), serves as a comparison.

The compound according to the invention displays a higher power over a considerably wider wavelength range.

Similarly good results are obtained when compounds of the following formula

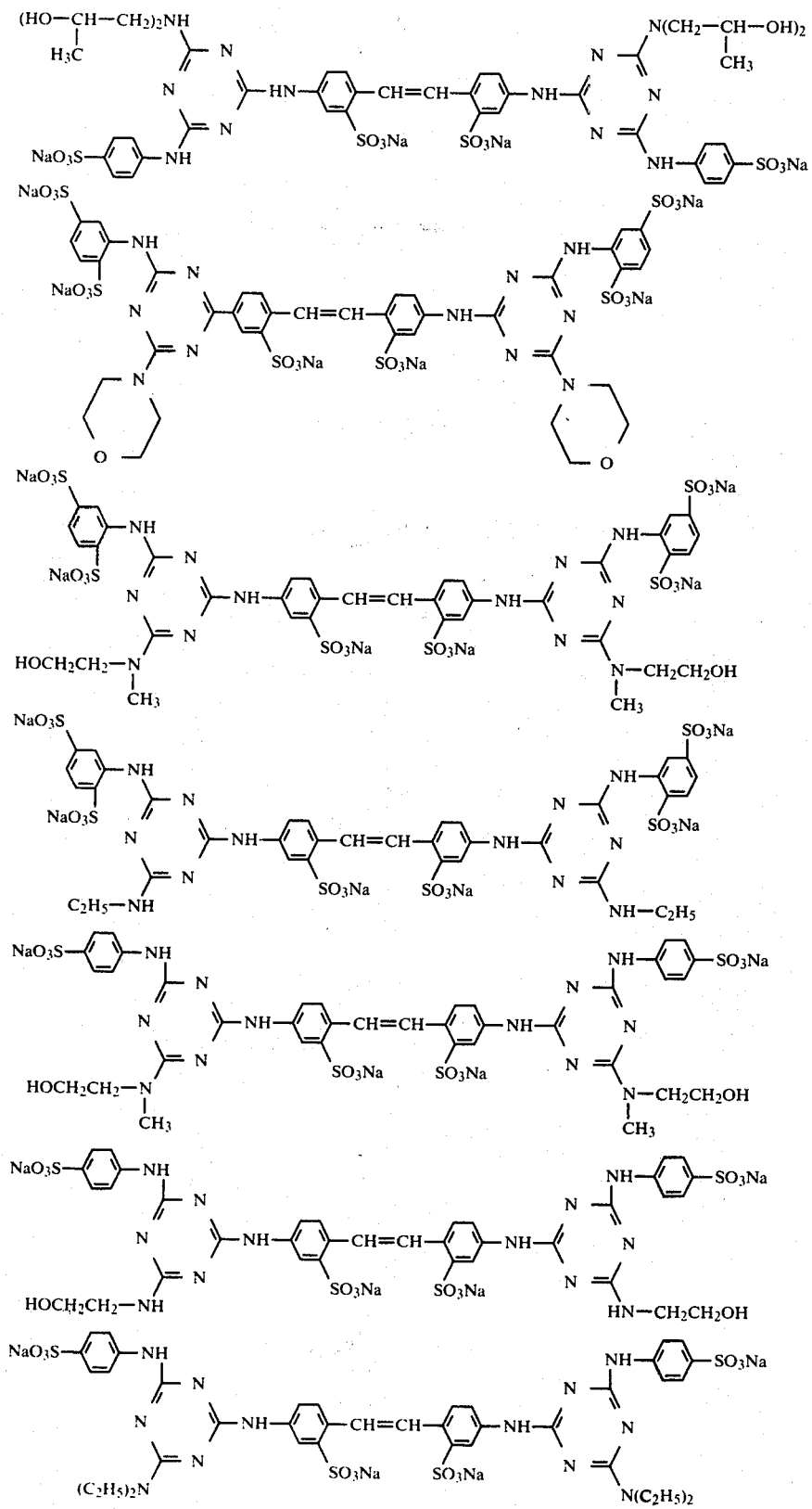

-continued
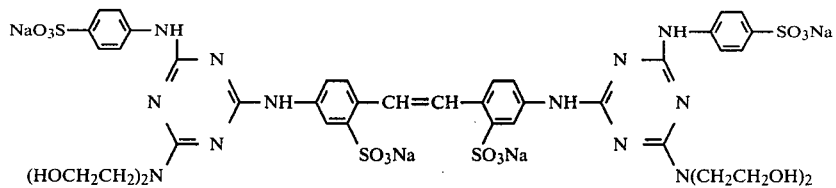
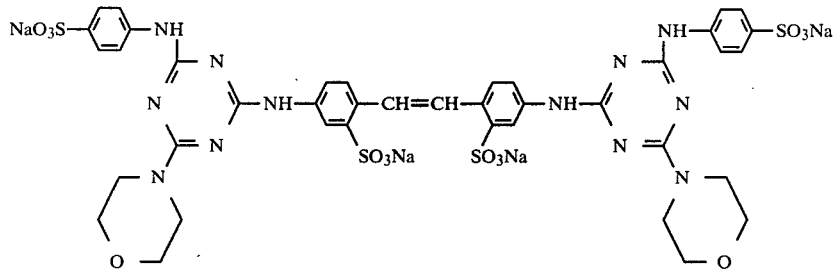
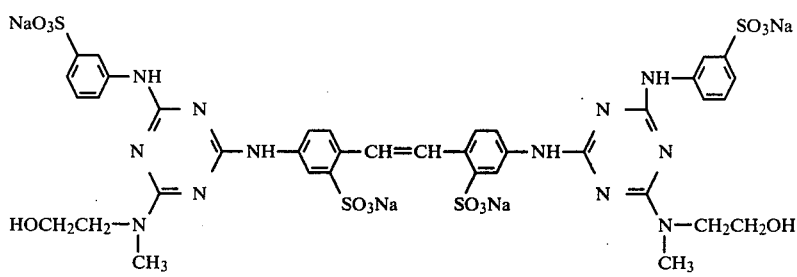
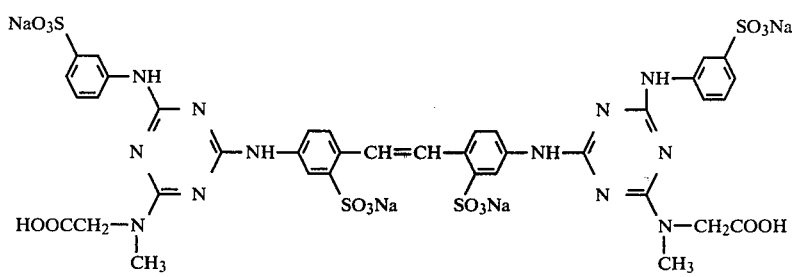
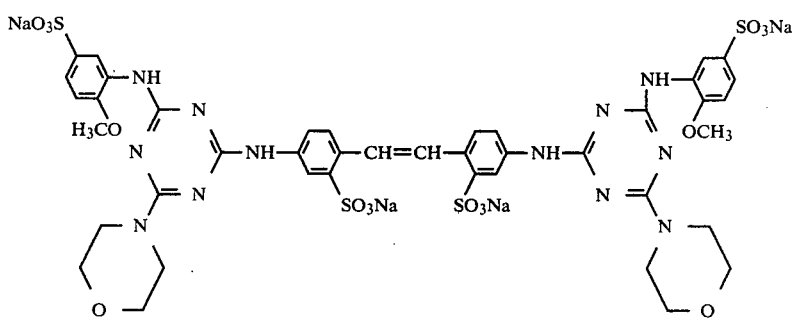
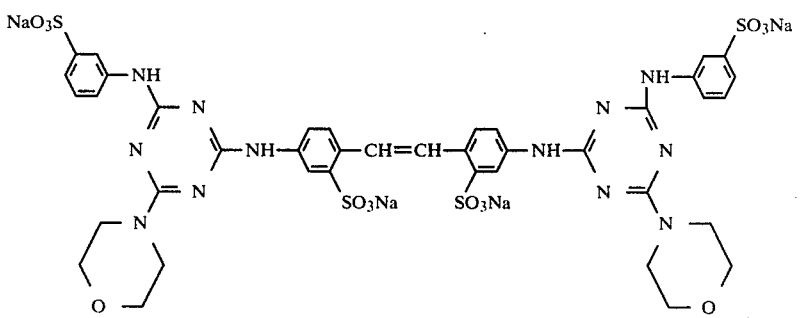

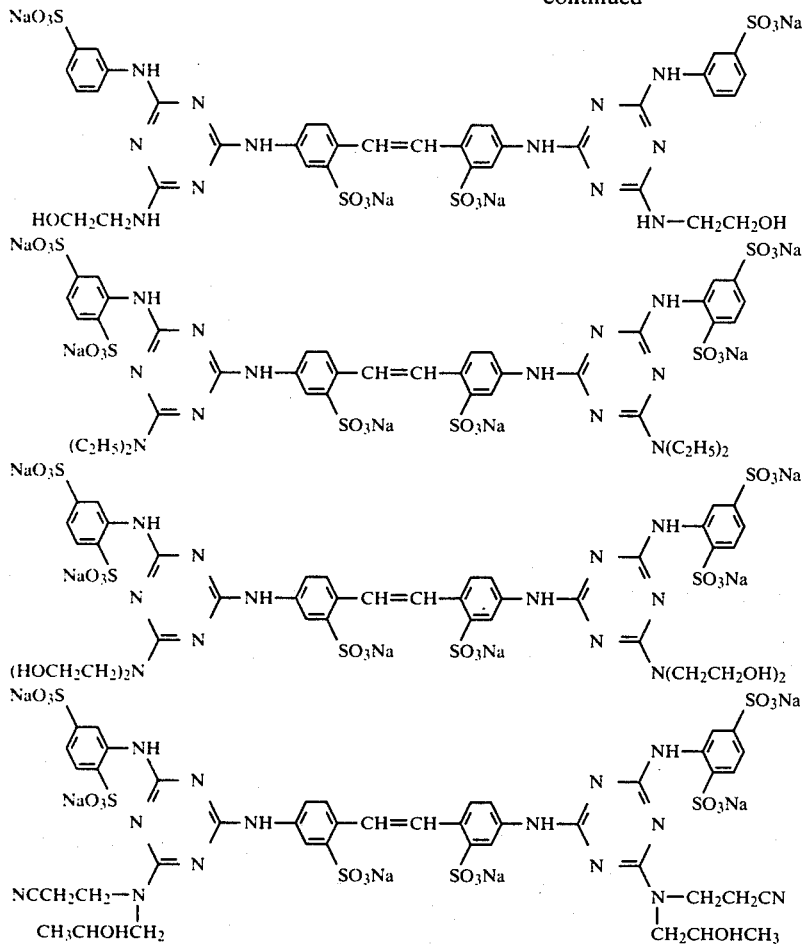

-continued

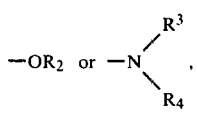

are employed in the same measuring apparatus in place of the compound indicated above.

We claim:

1. Dyestuff laser consisting of a reservoir, with a laser dyestuff solution contained therein, and a pump light source connected thereto, which is capable of exciting the dyestuff solution to produce an emission, characterised in that the dyestuff solution contains a dyestuff which, in the form of the free acid corresponds to the general formula

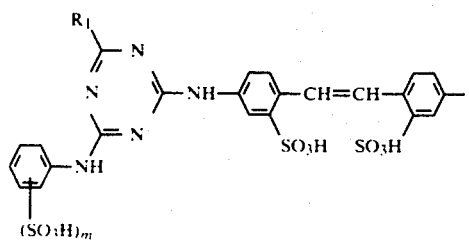

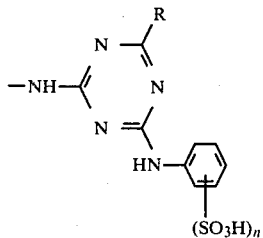

wherein

R and $R_1$ independently of one another represent $$-OR_2 \text{ or } -N\begin{matrix}R^3\\R_4\end{matrix},$$

$R_2$ denotes an optionally substituted alkyl radical with 1–4 C atoms, $R_3$ and $R_4$ independently of one another represent hydrogen or optionally substituted $C_1$–$C_4$ alkyl or conjointly with the nitrogen can form a 5-membered or 6-membered heterocyclic ring and m and n denote 1 or 2, and wherein the aromatic radicals contained in the formula can be further substituted, in a solvent which does not interfere with the emission, at a concentration, which emits laser beams, of, preferably, $10^{-2}$ to $10^{-5}$ mols/liter.

2. Dyestuff laser consisting of a reservoir, with a laser dyestuff solution contained therein, and a pump light source connected thereto, which is capable of exciting the dyestuff solution to produce an emission, characterised in that the dyestuff solution contains a dyestuff which, in the form of the free acid corresponds to the general formula

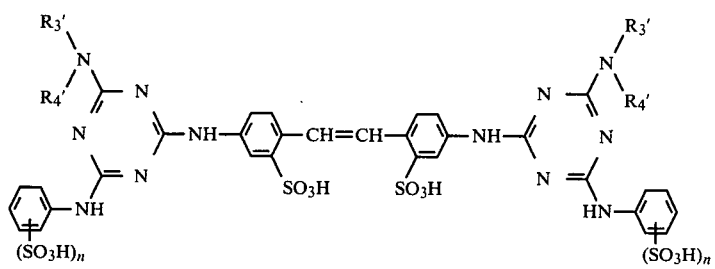

wherein
  $R_3'$ and $R_4'$ represent hydrogen, methyl, ethyl, hydroxyethyl or hydroxypropyl, or conjointly with the nitrogen represent the morpholine ring and
  n denotes 1 or 2,
in a solvent which does not interfere with the emission, at a concentration, which emits laser beams, of, preferably, $10^{-2}$ to $10^{-4}$ mols/liter.

3. A process for producing an emission which comprises pumping light into a reservoir containing a laser dyestuff solution, the dyestuff of said solution being one which, in the form of the free acid corresponds to the general formula

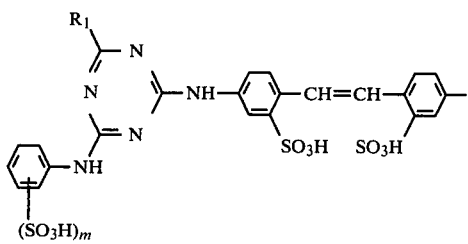

I

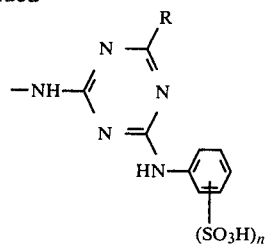

II wherein
  R and $R_1$ independently of one another represent $$-OR_2 \quad \text{or} \quad -N{\overset{R^3}{\underset{R_4}{\diagup}}}\;,$$

$R_2$ denotes an optionally substituted alkyl radical with 1-4 C atoms,
  $R_3$ and $R_4$ independently of one another represent hydrogen or optionally substituted $C_1$-$C_4$ alkyl or conjointly with the nitrogen can form a 5-membered or 6-membered heterocyclic ring and m and n denote 1 or 2, and
wherein
  the aromatic radicals contained in the formula can be further substituted,
wherein there is produced a coherent laser emission in the wave length range of 420–480 nm.

4. A process for producing an emission which comprises pumping light into a reservoir containing a laser dyestuff solution, the dyestuff of said solution being one which, in the form of the free acid corresponds to the general formula

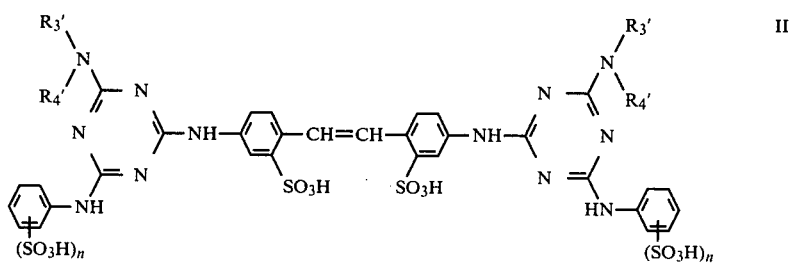

II wherein
  $R_3'$ and $R_4'$ represent hydrogen, methyl, ethyl, hydroxyethyl or hydroxypropyl, or conjointly with the nitrogen represent the morpholine ring and
  n denotes 1 or 2,
wherein there is produced a coherent laser emission in the wave length range of 420–480 nm.

* * * * *